US011288232B2

(12) United States Patent
Rao et al.

(10) Patent No.: US 11,288,232 B2
(45) Date of Patent: Mar. 29, 2022

(54) DATABASE DEPLOYMENT OBJECTS AND DETERMINISTIC LOCKING MODELS

(71) Applicant: Kyndryl, Inc., New York, NY (US)

(72) Inventors: Suryanarayana Rao, Bangalore (IN); Vikas Lalwani, Bangalore (IN); Shiben Dutta, Bangalore (IN); Clinton Vincen C, Bangalore (IN)

(73) Assignee: Kyndryl, Inc., New York, NY (US)

( * ) Notice: Subject to any disclaimer, the term of this patent is extended or adjusted under 35 U.S.C. 154(b) by 232 days.

(21) Appl. No.: 16/560,540

(22) Filed: Sep. 4, 2019

(65) Prior Publication Data

US 2021/0064573 A1 Mar. 4, 2021

(51) Int. Cl.
*G06F 16/11* (2019.01)
*G06F 16/23* (2019.01)

(52) U.S. Cl.
CPC ............ *G06F 16/128* (2019.01); *G06F 16/23* (2019.01)

(58) Field of Classification Search
CPC ............................... G06F 16/128; G06F 16/23
USPC .................................................. 707/769, 704
See application file for complete search history.

(56) References Cited

U.S. PATENT DOCUMENTS 6,701,345 B1 * 3/2004 Carley .................. G06F 16/252 709/205
8,898,126 B1 * 11/2014 Dai ..................... G06F 16/2308 707/703
9,436,721 B2 * 9/2016 Dillenberger ....... G06F 16/2343
10,268,709 B1 4/2019 Suehs et al.
2008/0189679 A1 * 8/2008 Rodriguez ................ G06F 8/34 717/105
2017/0169090 A1 * 6/2017 Jose ................. G06Q 10/06313
2018/0157710 A1 6/2018 Guirguis et al.
2019/0087477 A1 3/2019 Gardner et al.
2019/0108253 A1 4/2019 Ackermann
2019/0220449 A1 * 7/2019 Suehs ................... G06F 16/211
2020/0125549 A1 * 4/2020 Hoang ................ G06F 16/2343

OTHER PUBLICATIONS

Mell et al., "The NIST Definition of Cloud Computing", NIST, Special Publication 800-145, Sep. 2011, pp. 1-7.
Oracle Help Center, Enterpise Manager Licensing Information, "7 () Change Management for Databases", Dec. 2012, pp. 1-25, https://docs.oracle.com/cd/E11857_01/em.111/e11982/change_management.htm.

* cited by examiner

*Primary Examiner* — Michael Pham
(74) *Attorney, Agent, or Firm* — Scully, Scott, Murphy & Presser, P.C.; Ken Han, Esq.

(57) ABSTRACT

Methods and systems for deploying a database are described. In an example, a processor can generate an object that specifies a set of data from the database, a set of dependencies associated with the set of data, and a set of changes applicable to the set of data. The processor can determine a schedule to lock the set of data based on the set of dependencies. The processor can lock the set of data in accordance with the schedule. The processor can apply the set of changes to the set of data. The processor can release the set of data with the applied changes to update the database.

18 Claims, 8 Drawing Sheets

202

204

```
DEPLOYMENT-OBJ-001
   {snapshotRetention="00:30:00 00:00:00.00"
    snapshotType="..."
    suspend_sessions="false",
    exitOnLockFailure="true",
    jobScanWindow="00:01:00",
    releaseStart="01:30:00",
    releaseEnd="04:00:00",
    flushCache="true",

    ObjectList {
        OBJ-001 = {object_type="TS",
                   object_name="TS-001",
                   op="add",
                   seq=1,
                   attr1=value1,
                   attr2=value2....}

        OBJ-002 = {object_type="table",
                   object_name="FINCONTAB",
                   op="modify",
                   seq=2,
                   attr1=value1,
                   attr2=value2....,
                   acquire_lock="true"}

        OBJ- 003 = {object_type = "function",
                    object_name="reconcileBalances",
                    op="replace",
                    attr1=value1,
                    attr2=value2....,
                    acquire_lock="true",
                    codesource="<{C|B}LOB0011>"}
                }
    }
```

DATABASE DEPLOYMENT OBJECTS AND DETERMINISTIC LOCKING MODELS

BACKGROUND

The present application relates generally to computers and computer applications, and more particularly to database release methods and systems that can be implemented to deploy a database.

A system can deploy an application with database objects that support the application. The database objects can be deployed by generating scripts that can create both the database objects and associated data, and to support various operations on the database objects. In some examples, database objects can include tables, views, functions, packages, and other objects that may facilitate implementation of the application.

SUMMARY

In some examples, a system for deploying a database is generally described. The system can include a memory configured to store a database, and a processor comprising hardware. The processor can be configured to be in communication with the memory. The processor can be configured to generate an object that specifies a set of data from the database, a set of dependencies associated with the set of data, and a set of changes applicable to the set of data. The processor can be further configured to determine a schedule to lock the set of data based on the set of dependencies. The processor can be further configured to lock the set of data in accordance with the schedule. The processor can be further configured to apply the set of changes to the set of data. The processor can be further configured to release the set of data with the applied changes to update the database.

In some examples, a method for deploying a database is generally described. The method can include generating, by a processor, an object that specifies a set of data from the database, a set of dependencies associated with the set of data, and a set of changes applicable to the set of data. The method can further include determining, by the processor, a schedule to lock the set of data based on the set of dependencies. The method can further include locking, by the processor, the set of data in accordance with the schedule. The method can further include applying, by the processor, the set of changes to the set of data. The method can further include releasing, by the processor, the set of data with the applied changes to update the database.

In some examples, a computer program product for deploying a database is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 is a diagram showing an example deployment object relating to an implementation of database deployment objects and deterministic locking models in one embodiment.

DETAILED DESCRIPTION

To deploy or release a database with an associated application, a system can perform various database release techniques on the database to ensure that the database is being deployed with updated and correct data. Release scripts can be created, and can include database description language scripts, object modification scripts, index and tablespace creation/modification/drop scripts, and/or other types of scripts. In some examples, significant amount of time may be required to create the release scripts, evaluate dependencies among the objects, schedule a release of the database at appropriate times, and execute the scripts during a release window (e.g., a time to release the database). Further monitoring of during the release window may be required to ensure that running sessions (e.g., database sessions) of the database are stopped, appropriate data locks are acquired on desired objects, and scripts are being executed in the right sequence. The database and its associated application can be transitioned to a desired state which existed prior to the database release and complete validation of an environment running the application may need to be performed.

To be described in more detail below, the systems and methods being described in accordance with the present disclosure can alleviate the workload and time being used to perform various processes of database release and deployment process. For example, an example system 100 shown in FIG. 1 can include a daemon integrated into a database associated with an application. The daemon can be implemented by a processor including hardware. The daemon, when implemented by the processor, can create database objects of a deployment object type that includes multiple nested layers of specification or dependencies. The processor can identify particular dependencies of the created objects, and schedule locks on the created objects based on the identified dependencies. As a result of implementing this daemon to define or create objects of the deployment object type, and to schedule locks based on contents of the objects of the deployment object type, the processor can lock particular objects among the database in a deterministic manner (e.g., lock according to a known schedule), and can modify or update the particular locked objects, instead of locking and evaluating the database as a whole and generating scripts dynamically.

Figure 1:
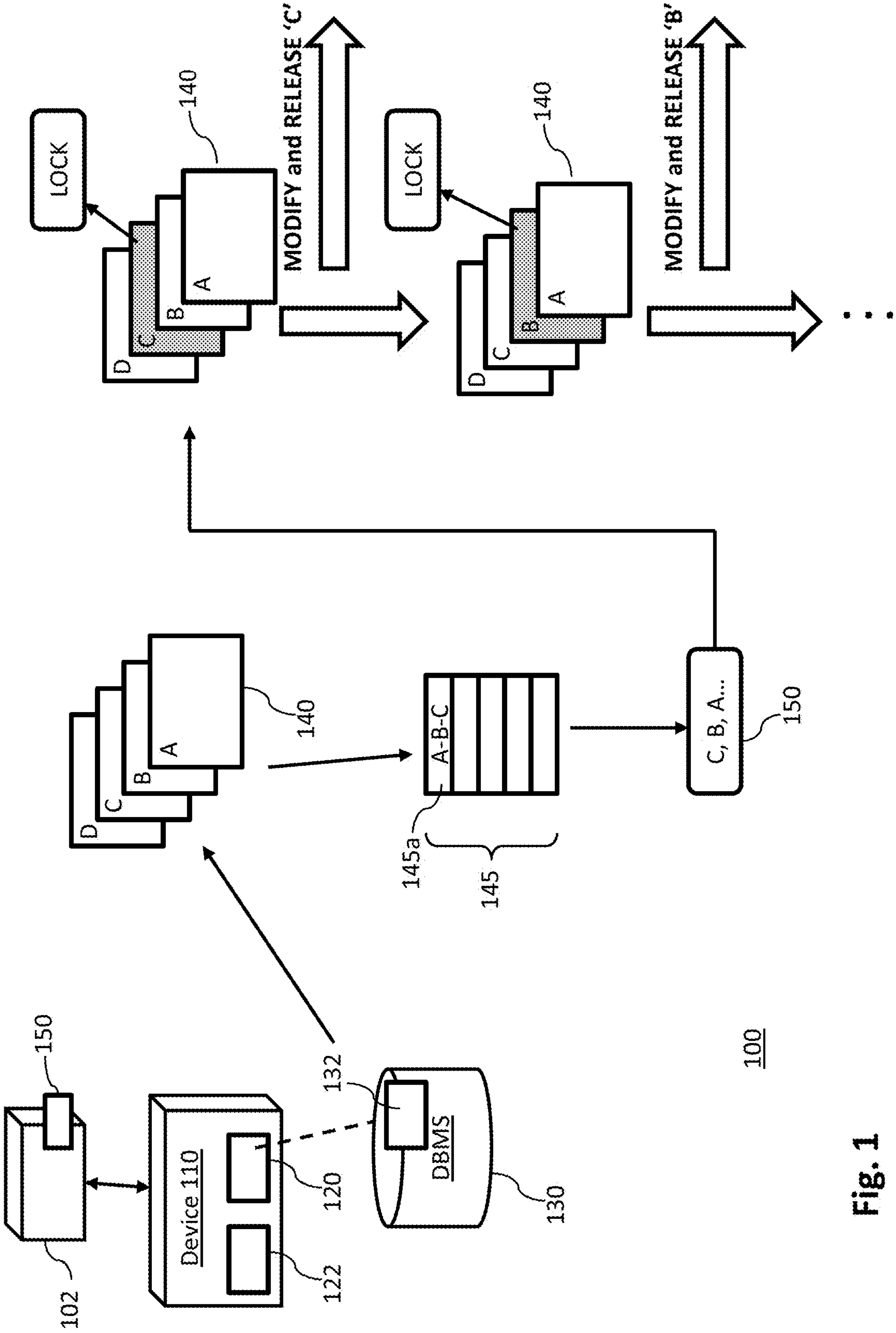
FIG. 1 is a diagram showing an example computer system that can implement database deployment objects and deterministic locking models in one embodiment.

FIG. 1 is a diagram showing the example computer system 100 that can implement database deployment objects and deterministic locking models in one embodiment. The system 100 can include a processor 120 and a memory 122 configured to be in communication with each other. In some examples, the processor 120 and the memory 122 can be components of a computer device 110 such as a server, a desktop or laptop computer, and/or other types of computer devices. The memory 122 can be configured to store data that can be used by the processor 120 to generate one or more databases, such as a database 140. The database 140 can include a plurality of data and/or objects, such as values, texts, tables, indexes, constraints, triggers, stored procedures, or other types of data and database objects. In some examples, the memory 122 can store instructions that can be executed by the processor 120 to perform the methods described in accordance with the present disclosure. For example, the instructions being stored in the memory 122 can include source code that can be compiled by the processor 120, object code resulting from compilation of source code, and/or executable code that can be run and loaded by the processor 120. In some examples, the processor 120 and the memory 122 can be components of a cloud computing platform.

The system 100 can further include a database management system (DBMS) 130, where DBMS 130 can be implemented as software that can be run by the processor 120. In some examples, the DBMS 130 can be implemented by the processor 120 to manage databases such as the database 140. In an example, the database 140 and the DBMS 130 can be associated with an application 150 that can be run by the processor 120, or can be run by a user device 102 configured to be in communication with the device 110. A configuration of the DBMS 130 can be based on a type or model of the database 140. For example, if database 140 is a relational database, then the DBMS 130 can be a relational DBMS (RDBMS). The application 150 can be a client-side application such as social media applications, banking applications, interactive media applications such as video games, and/or other types of information that can be run on the user device 102. In an example, a user of the user device 102 can request to initiate a database session, such as by, for example, using the user device 102 to make various selections in the running application 150 or entering various credentials to login to the application 150. The device 110 (or the processor 120) can create a client-server database session (or database session) by establishing a connection between the user device 102 and the DBMS 130 such that the application 150 running on the user device 102 can interact with the database 140 or with an instance of the database 140. In some examples, the device 110 can establish database sessions without requests from user devices on the client side. For example, background applications that may be used to monitor data usage of the user device 102 may have a session established by the device 110 but not linked to any particular client side session on the user device.

A manager 132 can be integrated in the DBMS 130, where the manager 132 (or a release manager) can be a module configured to perform specific functions and tasks in accordance with the present disclosure. In some examples, the manager 132 can be a daemon (e.g., a computer process or thread, which can be a background process) integrated into the DBMS 130, such that the processor 120 can run the manager 132 as a background process. The manager 132 can be configured to generate a plurality of deployment objects 145, where the deployment objects 145 are of a deployment object type. The deployment object type can define multiple nested layers of specifications, such as, 1) a set of data and/or database objects from the database 140 that may be dependent on each other, 2) changes that need to be applied, or that are applicable, to the specified set of data and/or database objects, 3) information relating to attributes such as a time of a recent snapshot of the set of the specified data and/or database objects, 4) a range of release time where the specified set of data and/or database objects can be released, 5) a time window in which the specified set of data and/or database objects can be scanned for potential lock, modification, and release tasks, and/or other types of information relating to the specified set of data and/or database objects corresponding to the deployment object. In some examples, a deployment object can specify another deployment object. For example, the system 100 can generate a master deployment object that specifies one or more other deployment objects that can be scheduled to be deployed in a particular sequence. Further, in some examples, instructions being stored in the memory 122 can specify a threshold to limit a number of database objects, and/or number of specification layers within a database object, that can be specified by the deployment objects 145. A format of the deployment object type will be described in more detail below with respect to an example provided in FIG. 2.

The manager 132 can identify and extract contents, and properties, from the deployment objects 145 to determine a schedule 150, where the schedule 150 can be a schedule indicating an order to lock, modify, and release data and/or database objects among the database 140 in a sequential manner. For example, the manager 132 can identify and extract dependencies at the object level such as dependencies between database objects, and also dependencies at sessions level and workload level (described below). The manager 132 can determine the schedule 150 using a deterministic locking model to schedule future time slices or windows to request and acquire locks on corresponding data and/or database objects. In an example, a lock manager of the DBMS 130 can use the deterministic locking model to receive requests from competing processes and can provide the competing processes with a deterministic window indicating a time in which their lock is assured (or not). The deterministic locking model can also take into account forecasted workloads, existing workloads and object dependencies at multiple layers to facilitate the determination of the schedule 150 by the manager 132. The schedule 150 will be described in more detail below.

In an example shown in FIG. 1, a deployment object **145*a* can include or specify a set of data or database objects A, B, and C, and can indicate that database objects A, B, and C are related to each other. Further, the deployment object 145*a* can specify a dependency order, such as "A depends on B" and "B depends on C". Furthermore, the deployment object 145*a* can specify a set of changes that are applicable or that needs to be applied to the database objects A, B, and C. Based on the specifications of the deployment object 145*a*, the processor 120 can determine or update the schedule 150 to indicate a locking order, which can be a reverse dependency order (e.g., opposite of the specified dependency order), to lock the database objects A, B, and C. Thus, the schedule 150** can indicate that database object C shall be locked, modified, and release, prior to locking, modifying, and releasing database object B. Note that if A, B, and C are deployment objects, then database objects specified by deployment object C can be locked, modified, and release before database objected being specified by deployment object B.

Based on the schedule 150, the manager 132 can lock particular data and database objects in the database 140, modify the locked database objects, and release the modified database objects in a sequential manner (e.g., one at a time). Note that the system 100 can also suspend any running sessions that accesses the locked database objects in accordance with the schedule 150. Such sequential manner allows changes to be applied to database objects of the database 140 without locking the entire database 140, which can allow other portions of the database 140 that are not locked to remain accessible, such as by running database sessions between the device 110 and the user device 102. Thus, data or database objects of the database 140 can be deployed individually into a desired state of the database 140.

The system 100 utilizes a daemon or module (manager 132) integrated in the DBMS 130. Thus, the system 100 may not need external services and applications to deploy changes to the database 140. Further, such an embodiment allows the system 100 to avoid a need to issue any external calls since calls can be locally constructed and performed within the DBMS 130 by the manager 132. Furthermore, to be described in more detail below, the manager 132 can extract, from the deployment objects 145, dependencies between existing running sessions and future workloads in additional to conventional database object dependencies. The manager 132 can extract dependencies between existing running sessions and future workloads by querying historical workloads, and session statistics, that can be stored in the memory 122. Still further, the schedule 150 allows data or object locks to be scheduled in advance, which can prevent other workloads from accessing or acquiring locks on those objects at release time. By scheduling locks in advance, the system 100 can reduce a need for the processor 120 to generate scripts or code statically or dynamically during release and deployment processes.

FIG. 2 is a diagram showing an example deployment object relating to an implementation of database deployment objects and deterministic locking models in one embodiment. FIG. 2 may include components that are labeled identically to components of FIG. 1, which are not described again for the purposes of clarity. The description of FIG. 2 may reference at least some of the components of FIG. 1.

An example deployment object 200 is shown in FIG. 2. The deployment object 200 can include multiple layers of nested specifications, such as specifications 202 and 204. The deployment object 200 ("DEPLOYMENT-OBJ-001") can specify a set of data identified as "OBJ-001", "OBJ-002", and "OBJ-003". The specifications 202 can indicate various contents and properties relating to the set of data "OBJ-001", "OBJ-002", and "OBJ-003". For example, the specifications 202 can specify:

- a snapshot retention time range ("snapshotRetention") indicating a length of time in which a snapshot of the set of data will be retained;
- a snapshot type ("snapshotType") of the snapshot of the set of data, which can include, for example, clone objects at schema level, snapshot at a block level within the database 140, block level backups, and/or other types of snapshots;
- whether any sessions (e.g., running applications) that may use the set of data are being suspended or not (e.g., suspend_sessions="false" indicates no sessions are suspended);
- a configuration of whether to exit an application in response to a failure to lock the set of data (e.g., exitOnLockFailure="true" indicates a command to exit in response to a failure to lock);
- a time slice or window ("jobScanWindow") to perform a scan on the set of data or jobs that may need to access the set of data, where the scan can be a scan for any changes that may need to be made to modify and update the set of data;
- a start time ("releaseStart") and an end time ("releaseEnd") of a period or time slice in which the set of data is being deployed or released; and
- a configuration ("flushCache") indicating whether to flush a cache (e.g., a cache of the processor 120) upon modifying the set of data.

The specification 204 can be an object list listing the set of data "OBJ-001", "OBJ-002", and "OBJ-003" and specifying attributes or properties of each data among the set of data. In an example, the specification 204 can specify that an object type of OBJ-001 is "TS" (tablespace), an object name of OBJ-001 is "TS-001", an operation "op" indicating an operation to modify OBJ-001, and a plurality of values or attributes that needs to be modified. For example, the specification 204 can indicate an operation of "add", an attribute "attr1=value1" which can indicate "add value1 to attr1", and an attribute "attr2=value2" which can indicate "add value2 to attr2". Note that other contents, properties, attributes, in addition to the examples shown in FIG. 2, can be specified by a deployment object. In an example, objects that can be specified by a deployment object can include, but not limited to, tables, indices, database types, database links, external tables, packages, functions, and other database objects that may be supported by a DBMS associated with the system 100 (e.g., any particular DBMS vendor).

Figure 3:
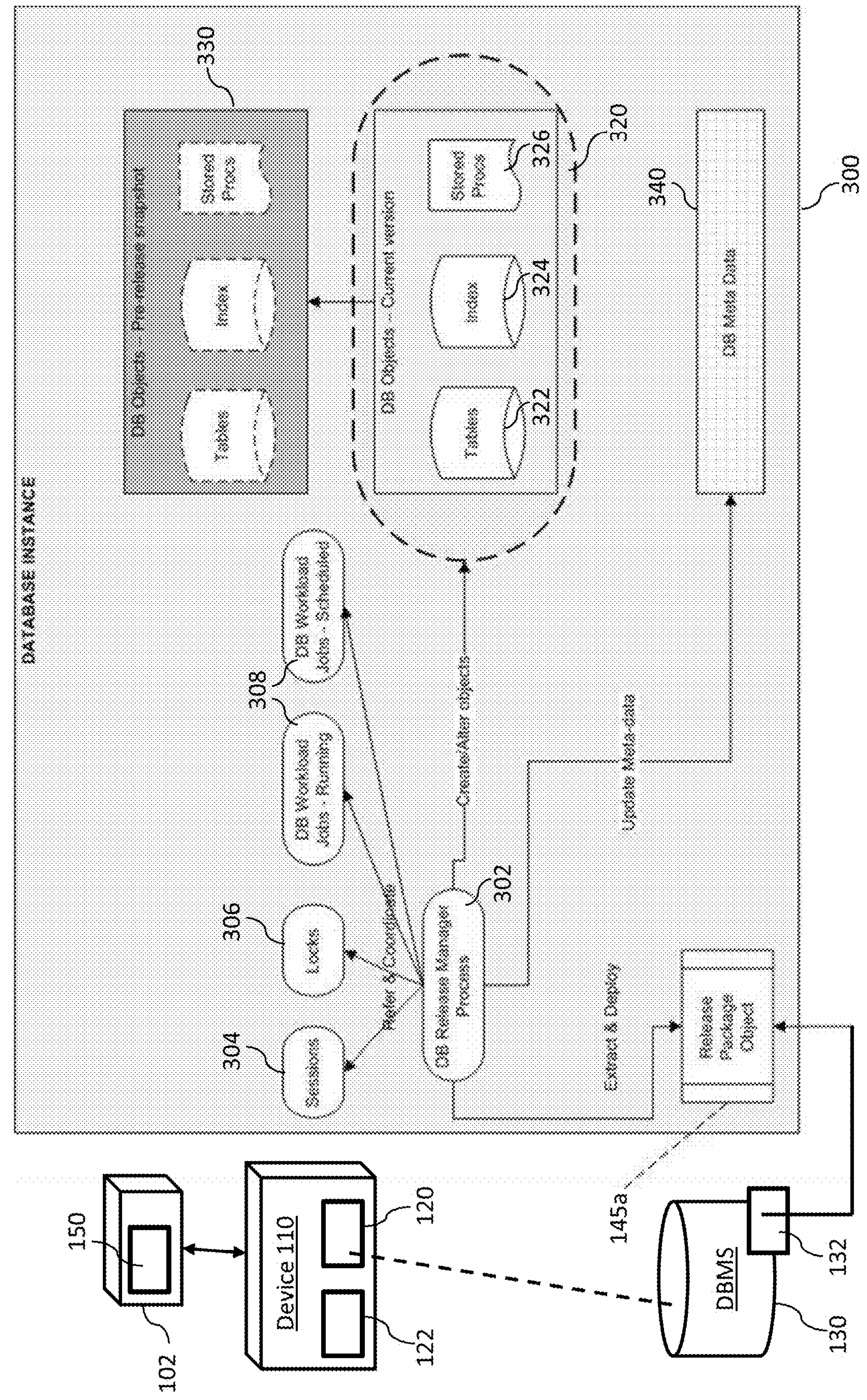
FIG. 3 is a diagram showing an example implementation of a release manager relating to database deployment objects and deterministic locking models in one embodiment.

FIG. 3 is a diagram showing an example implementation of a release manager relating to database deployment objects and deterministic locking models in one embodiment. FIG. 3 may include components that are labeled identically to components of FIGS. 1-2, which are not described again for the purposes of clarity. The description of FIG. 3 may reference at least some of the components of FIGS. 1-2.

A database instance 300 is shown in FIG. 3, where the database instance 300 can be an instance of the database 140. In some examples, the database instance 300 can be associated with a particular database session running between the device 110 and a device external to the device 110. For example, the database instance 300 can be an instance, or a state, of the database 140 being generated by the processor 120 in response to a session being established between the DBMS 130 and an external device such as the user device 102. The manager 132, which can be integrated in the DBMS 130, can detect changes being made to the database instance 300 by the user device 102. For example, any changes being made to the database 140 by the user device 102 can be detected by the manage 132 in the DBMS 130 based on communications of various data and messages within the session established between the user device 102 and the DBMS 130. The processor 120 can update the database 140 based on the changes being applied to the database instance 300.

In an example shown in FIG. 3, the deployment object 145*a* can be a part of the database instance 300. The deployment object 145*a* can specify data or database objects including, for example, tables 322, indices 324, and stored processes 326, of the database instance 300. A DB release manager process (process 302) can be run by the processor 120 (or the manager 132) to facilitate updates to the database instance 300. The process 302, in some examples, can be a component of the DBMS 130, such as instructions or code integrated, by the processor 120, into the DBMS 130. The process 302 can be run by the manager 132 to detect, for example, one or more sessions that are running on the device 110 (e.g., other sessions established between the device 110 and other user devices) that may need to access the data specified by the deployment object 145*a* (detected sessions 304). The process 302 can also be run to detect, for example, whether any data among the deployment object 145*a* are locked in the database instance 300 (detected locks 306). The process 302 can also be run to detect, for example, workload of current or running jobs that accesses the data specified by the deployment object 145*a*, and workload of scheduled jobs that will need to access the data specified by the deployment object 145*a* (detected workloads 308).

The process 302 can generate a copy or a snapshot 330 of a current version 320 of the data specified by the deployment object 145*a*. For example, the processor 120 can generate a snapshot 330 that is a copy of the current version 320 of the tables 322, indices 324, and stored processes 326. The current version 320 can correspond to current values of data among the database 140 or the database instance 300. The processor 120 can update the deployment object 145*a* with the detected sessions 304, the detected locks 306, and the detected workloads 308. Further, the process 302 can update metadata 340 of the database instance 300 and can store the updated metadata 340 in the memory 122. Thus, the creation of deployment objects 145 by the device 110 allows the manager 132 implemented by the processor 120 to generate snapshots of particular database objects for various update and modification functions, instead of generating snapshots of the entire database 140.

Figure 4:
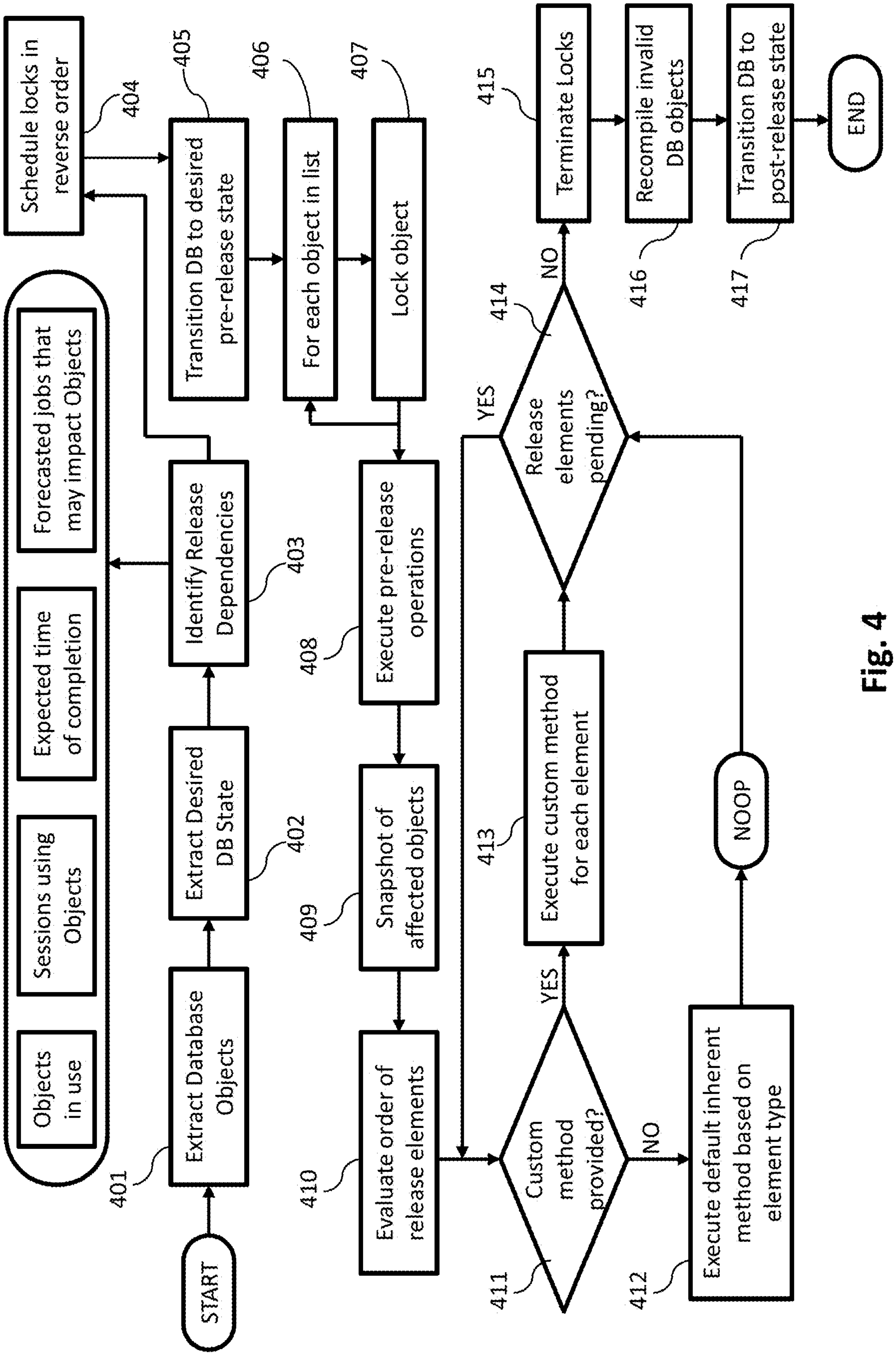
FIG. 4 is a flow diagram illustrating a process relating to database deployment objects and deterministic locking models in one embodiment.

FIG. 4 is a flow diagram illustrating a process relating to database deployment objects and deterministic locking models in one embodiment. FIG. 4 may include components that are labeled identically to components of FIGS. 1-3, which are not described again for the purposes of clarity. The description of FIG. 4 may reference at least some of the components of FIGS. 1-3.

The process illustrated in FIG. 4 is a process that can be performed by the system 100 using a database instance of the database 140 (e.g., database instance 300). Starting at block 401, the processor 120 (or the manager 132) of the device 110 can extract release objects or database objects specified by a deployment object, such as the deployment object 145*a*. The extracted objects can be database objects that may need modification (specified in the deployment object 145*a*) or updates before deployment of the database 140. The process can continue from block 401 to 402. At block 402, the processor 120 can extract a desired database state of the database 140. For example, a desired state of the database 140 can be a version of the database 140 indicating target values and/or states of database objects (identified at block 401) that can be achievable by making modifications specified by the deployment object 145*a*.

The process can continue from block 402 to block 403. At block 403, the processor 120 can identify dependencies corresponding the database objects specified by the deployment object 145*a*. For example, a first dependency can be a usage dependency, such as "object in use", which indicates whether the database objects identified in block 401 are currently in use. For example, database objects that are in use can include database objects that are being accessed by one or more sessions bring run by the device 110. A second dependency can be a dependency at the sessions level, such as "sessions using objects", which indicates that the objects identified in block 401 are being used by database sessions established between the DBMS 130 and the application 150 being run on the user device 102. A third dependency can be at the workload level, such as "expected time of completion", which indicates an expected amount of time that may be required to complete a job using the objects identified in block 401. Another workload level dependency can be "forecasted jobs that may impact objects", which indicates one or more jobs that may need to use the objects identified in block 401 in a future time frame.

The process can continue from block 403 to block 404. At block 404, the processor 120 can use the extracted contents from blocks 401, 402, and 403, to generate the schedule 150. For example, objects that are in use by a running session of the application 150 or jobs can be scheduled for modifications before objects that may need to be used by future jobs and sessions. In some examples, the dependencies at the sessions level and the workload level can be based on historical workloads and session statistics that may be stored in the memory 122. The processor 120 can be configured to query these stored historical workloads and session statistics to identify the dependencies. For example, historical data stored in the memory 122 can indicate that a job or a process X of a database session needs to access database objects A, B, C, and another process Y of the database session needs to access database objects A and C, and process X has a dependency on process Y. Based on these historical data, the processor 120 can schedule requests to lock and modify the database objects A and C (in accordance with the schedule 150, such as locking C before A) in a first time window or time slice (note C can be locked in a first portion of the time window, then A can be locked in a second portion of the time window), and to lock the database objects A, B, and C in a second time window that may be later than the first time window. In other words, as an example, the schedule 150 can indicate a lock order of C, A, C, B, A, and each object being locked can be modified or updated prior to locking the next object (lock C, modify C, then lock A, etc.) In some examples, the processor 120 can implement machine learning techniques to model a job implementation sequence and use the modeled sequence to generate the schedule 150. In some examples, the schedule 150 generated by the processor can be a deterministic locking model deterministic locking model that allows for processes to schedule time slices in the future where locks on particular database objects can be requested and acquired. Such deterministic locking model can also allow for existing database lock managers (that may be a component of system 100) to receive requests from competing processes and provide them with a deterministic time window (or time slice) when their lock is assured (or not). In an example, a time slice can be a fixed future times where a reservation has been made for database objects. For example, referring to the specification 202 in FIG. 2, the database objects under specification 204 are scheduled to be released from a start time of "01:30:00" to an end time of "04:00:00". Thus, the database objects under the specification 204 can be locked at the time slice from "01:30:00" to "04:00:00", and any processes or sessions being run by the device 110 may not access these database objects and may not request any locks on these database objects in this time slice. As such, a deployment process of the objects under specification 204 can be completed without interruptions that may be invoked by lock requests from other processes or sessions. Further, the processor 120 can schedule locks on database objects in advance (e.g., prior to receiving a lock request), which can prevent other workloads from accessing or acquiring locks on those database objects at the time of the release or deployment of the database 140 or individual database objects among the database 140.

The process can continue from block 403 to block 405. At block 405, the processor 120 can transition the database 140 to a desired pre-release state. For example, a pre-release state of the database 140 can be a state of the database 140 before a start of the deployment of the database 140. The pre-release state of the database 140 can be stored in the memory 122 such that in a case of a failure being experience by the system 100, the database 140 can be reverted back to the pre-release state to prevent data loss. The process can continue from block 405 to blocks 406, 407. At blocks 406, 407 the processor 120 can lock each database object specified by the deployment objects 145 according to the schedule 150. For example, as illustrated in the example of FIG. 1, the database objects A, B, C are being locked in a sequence of C, B, A, based on the schedule 150. The process can continue from block 407 to block 408. At block 408, the processor 120 can execute pre-release steps or operations on the locked objects, such as creating a database link to another remote database, transfer a file to an interface system, output alert notifications, terminate application sessions that may be accessing locked database objects, etc. The execution of the pre-release steps can be performed in a sequence in accordance with the lock sequence of the database objects performed at blocks 406, 407.

The process can continue from block 408 to block 409. At block 409, the processor 120 can generate snapshots of the locked objects that underwent the pre-release steps at block 408. The processor 120 can generate the snapshot by, for example, cloning the database objects at the schema level, generating snapshots of the database objects at the block level, and generating block level backups of the database objects. The process can continue from block 409 to block 410. At block 410, the processor 120 can evaluate a release order of the locked objects. For example, even though database objects A, B, C are locked in the order of C, B, A, an implementation of the application 150 may require the database objects A, B, C to be released and deployed in another sequence, such as B, C, A.

The process can continue from block 410 to block 411. At block 411, the processor 120 can determine whether any custom release methods are needed to be performed on the locked database objects. The custom release methods can be, for example, running various programs, batch files, database scripts, shell script, etc. If no custom methods are necessary, the process can continue to block 412, where the processor 120 can execute default release methods, that may be defined by instructions stored in the memory 122, on the locked database objects. If custom methods are necessary, the process can continue to block 413, where the processor 120 can execute the custom release methods, that may be defined by instructions stored in the memory 122, on the locked database objects. The process can continue from block 412 or 413 to block 414. At block 414, the processor 120 can determine whether any locked database objects have yet to undergo modifications specified by the deployment object 145*a*.

If no more locked objects are pending modifications, the process can continue from block 414 to block 415. At block 415, the processor 120 can terminate the locks on the locked database objects. The process can continue from block 415 to block 416. At block 416, the processor can recompile the database 140 using the modified database objects. The process can continue from block 416 to block 417. At block 417, the processor can transition the database 140 to a post-release state, such as a version of the database 140 after deployment of the database objects is completed.

The process illustrated in FIG. 4 can be updated by the processor 120. For example, the dependencies identified at block 403 can be updated due to changes in the database 140, or changes such as user input provided by the user device 102 that may be running the application 150. As a result, the schedule 150 generated at block 404 may also be changed. Further, the dependencies and modifications made in the process illustrated in FIG. 4 can be stored, by the processor 120, in the memory 122 for future use, such as modeling of the workload sequence that can be used for identification of dependencies and generation of the schedule 150 as discussed above. In some examples, the processor 120 can perform other operations relating to deployment of the database 140. For example, the updated database 140 resulting from the process illustrated in FIG. 4 can be compared with the desired state of the database 140 extracted in block 402 to determine whether the modifications made are satisfactory and compliant for deployment to, for example, the user device 102.

Figure 5:
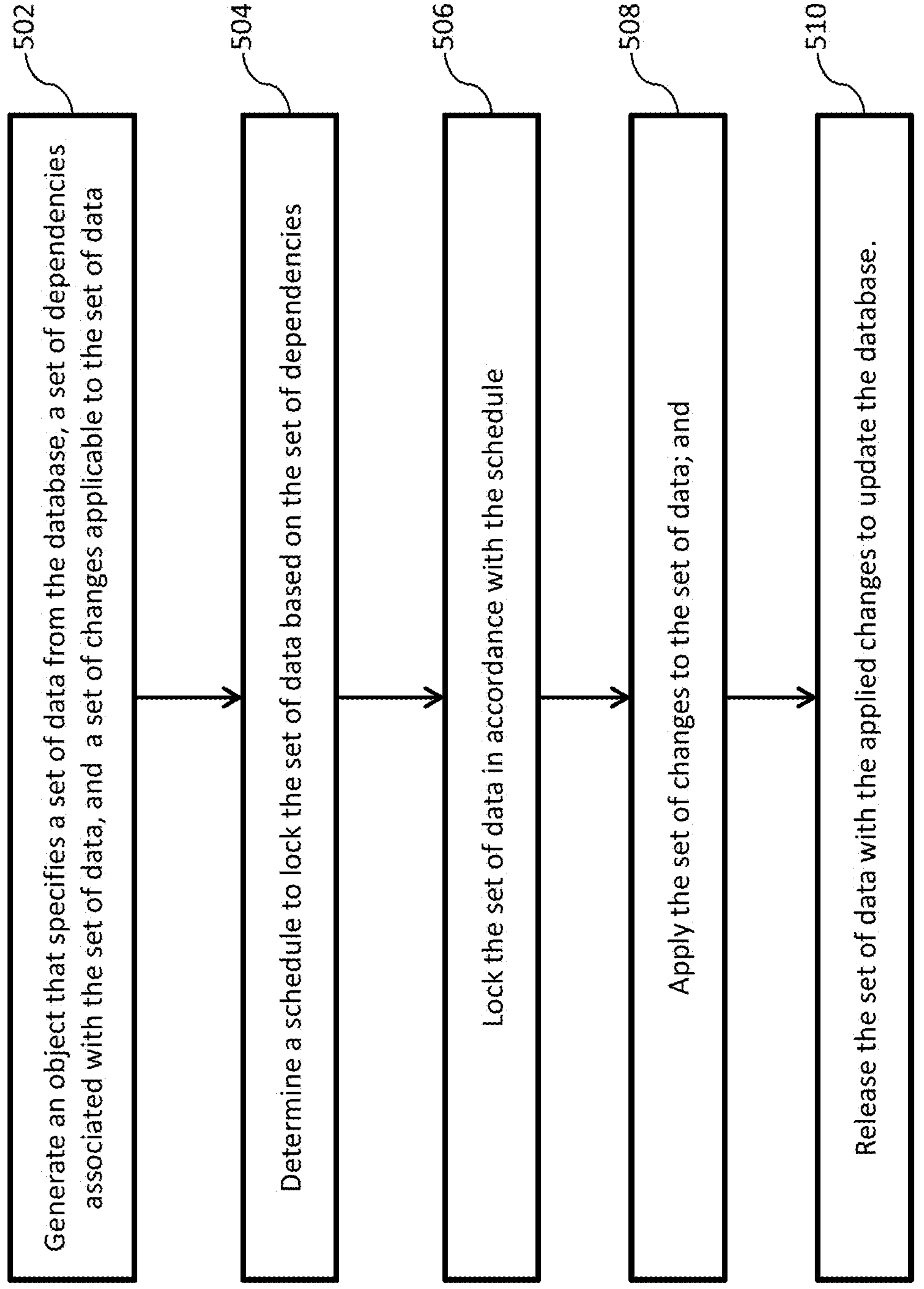
FIG. 5 is a flow diagram illustrating a process relating to database deployment objects and deterministic locking models in one embodiment.

FIG. 5 is a flow diagram illustrating a process that can be performed by a processor to implement database deployment objects and deterministic locking models in one embodiment. An example process may include one or more operations, actions, or functions as illustrated by one or more of blocks 502, 504, 506, 508, and/or 510. Although illustrated as discrete blocks, various blocks may be divided into additional blocks, combined into fewer blocks, eliminated, or performed in parallel, depending on the desired implementation. The description of the flow diagram of FIG. 5 may reference at least some of the components of FIGS. 1-4.

The process can begin at block 502, where a processor can generate an object that specifies a set of data from the database, a set of dependencies associated with the set of data, and a set of changes applicable to the set of data. In some examples, the set of dependencies indicate at least one of dependencies among data of the set of data, dependencies associated with running sessions of at least one application using the set of data; and dependencies associated with workloads of the set of data. In some examples, the processor can identify the set of dependencies based on at least historical data of the dependencies associated with running sessions and the dependencies associated with the workloads. In some examples, the dependencies can indicate a dependency order of the data among the set of data, and the schedule can indicate a reverse dependency order to lock the data among the set of data The process can continue from block 502 to block 504. At block 504, the processor can determine a schedule to lock the set of data based on the set of dependencies. The process can continue from block 504 to block 506. At block 506, the processor can lock the set of data in accordance with the schedule. In some examples, at least a portion of the database can remain accessible in response to the lock of the set of data.

The process can continue from block 506 to block 508. At block 508, the processor can apply the set of changes to the set of data. In some examples, the processor can generate a snapshot of the set of data and apply the set of changes to the snapshot. In some examples, the locking and application of the set of changes can be performed on the data among the set of data sequentially. The process can continue from block 508 to block 510. At block 510, the processor can release the set of data with the applied changes to update the database.

Figure 6:
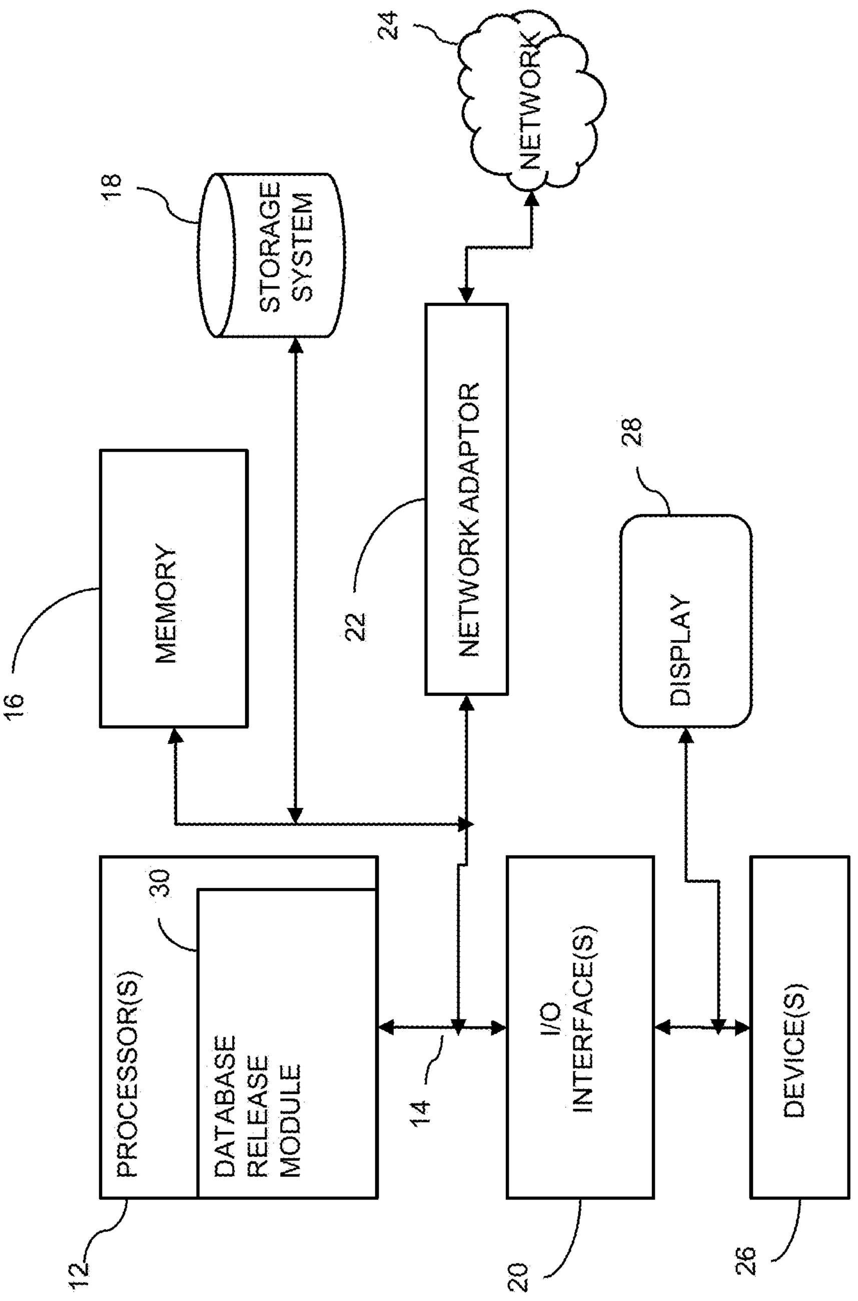
FIG. 6 illustrates a schematic of an example computer or processing system relating to database deployment objects and deterministic locking models in one embodiment.

FIG. 6 illustrates a schematic of an example computer or processing system that may implement database deployment objects and deterministic locking models in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., database release module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 7:
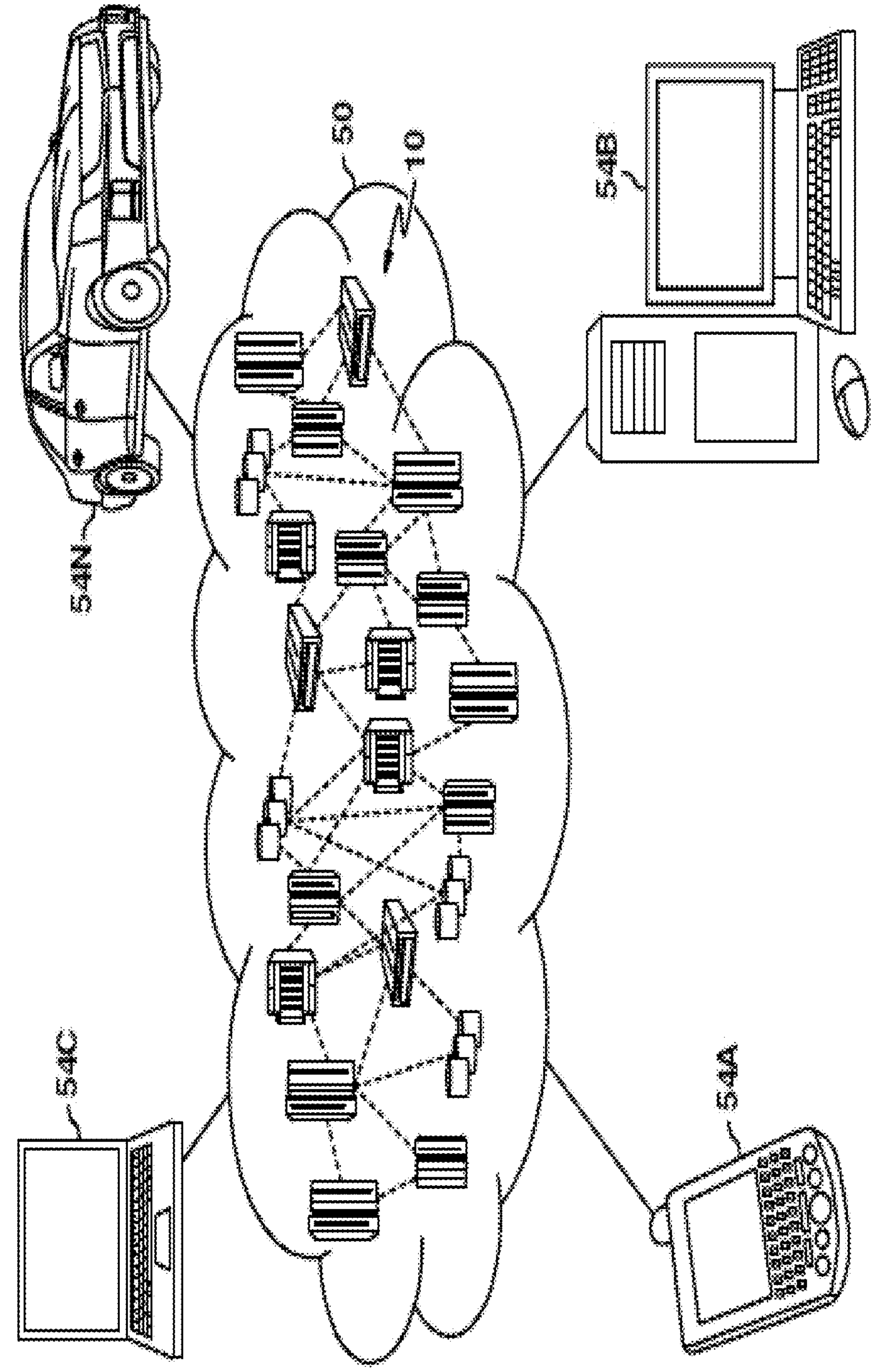
FIG. 7 depicts a cloud computing environment according to an embodiment of the present invention.

FIG. 7 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
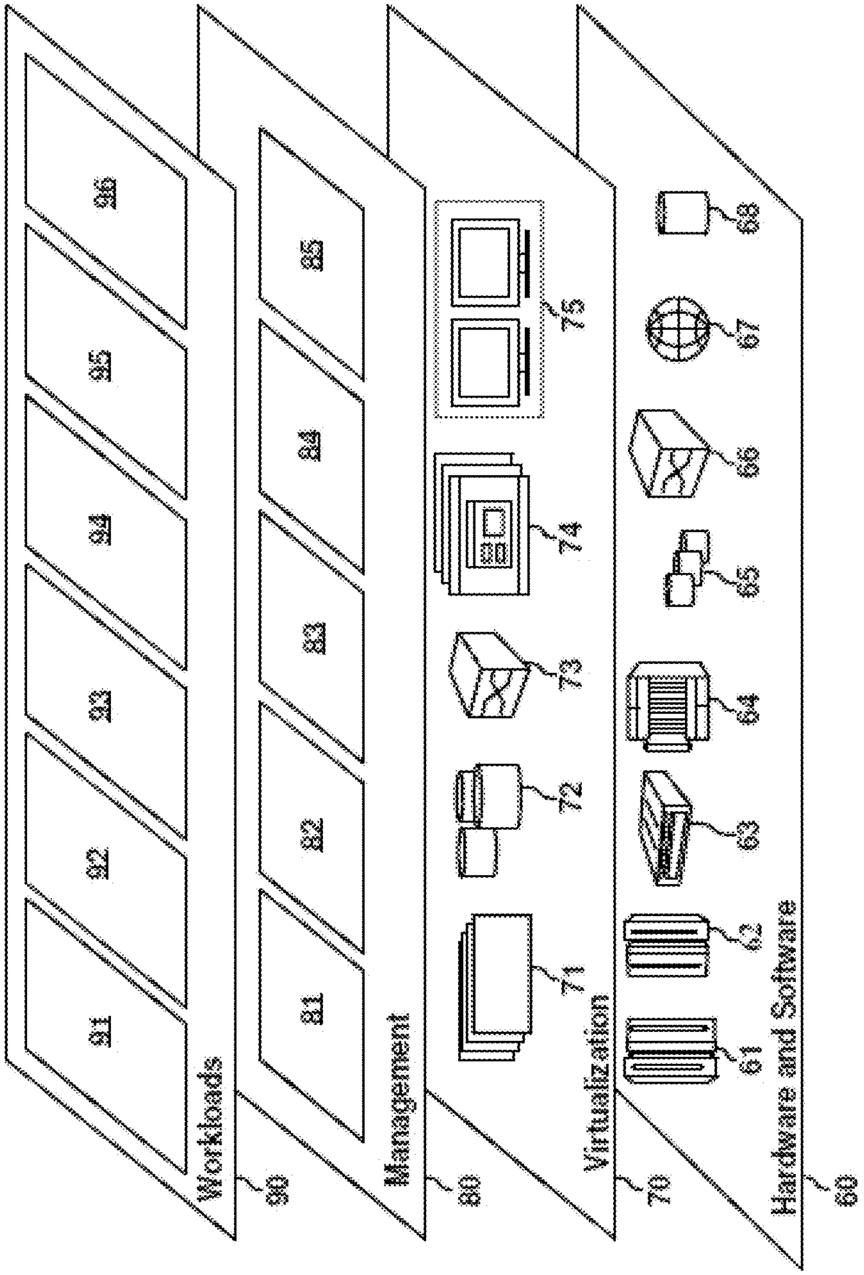
FIG. 8 depicts abstraction model layers according to an embodiment of the present invention.

FIG. 8 depicts abstraction model layers according to an embodiment of the present invention. Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database release and deployment 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:

a memory configured to store a database;

a processor comprising hardware, the processor being configured to be in communication with the memory, and the processor being configured to:

generate an object that specifies:

a set of data from the database, a set of dependencies associated with the set of data, and a set of changes applicable to the set of data;

determine a schedule based on the set of dependencies, wherein the schedule indicates a sequential order to individually:

lock a data among the set of data;

apply a change among the set of changes to the locked data; and release the locked data with the applied changes to update the database.

2. The system of claim 1, wherein the set of dependencies indicate at least one of:

dependencies among data of the set of data;

dependencies associated with running sessions of at least one application using the set of data; and dependencies associated with workloads of the set of data.

3. The system of claim 2, wherein the processor is configured to identify the set of dependencies based on at least historical data of the dependencies associated with running sessions and the dependencies associated with the workloads.

4. The system of claim 1, wherein the processor is configured to generate a snapshot of the set of data and apply the set of changes to the snapshot.

5. The system of claim 1, wherein the dependencies indicate a dependency order of the data among the set of data, and the sequential order is a reverse dependency order to lock the data among the set of data.

6. The system of claim 1, wherein at least a portion of the database remain accessible in response to the lock of the set of data.

7. A computer-implemented method comprising:

generating, by a processor, an object that specifies:

a set of data from the database, a set of dependencies associated with the set of data, and a set of changes applicable to the set of data;

determining, by the processor, a schedule based on the set of dependencies, wherein the schedule indicates a sequential order to individually perform:

locking, by the processor, a data among the set of data;

applying, by the processor, a change among the set of changes to the locked data; and releasing, by the processor, the locked data with the applied changes to update the database.

8. The computer-implemented method of claim 7, wherein the set of dependencies indicate at least one of:

dependencies among data of the set of data;

dependencies associated with running sessions of at least one application using the set of data; and dependencies associated with workloads of the set of data.

9. The computer-implemented method of claim 8, further comprising identifying, by the processor, the set of dependencies based on at least historical data of the dependencies associated with running sessions and the dependencies associated with the workloads.

10. The computer-implemented method of claim 7, further comprising:

generating, by the processor, a snapshot of the set of data; and applying, by the processor, the set of changes to the snapshot.

11. The computer-implemented method of claim 7, wherein the dependencies indicate a dependency order of the data among the set of data, and the sequential order is a reverse dependency order to lock the data among the set of data.

12. The computer-implemented method of claim 7, wherein at least a portion of the database remain accessible in response to the lock of the set of data.

13. A computer program product for deploying a database, the computer program product comprising a computer readable storage medium having program instructions embodied therewith, the program instructions executable by a processor of a device to cause the device to:

generate an object that specifies:

a set of data from the database, a set of dependencies associated with the set of data, and a set of changes applicable to the set of data;

determine a schedule based on the set of dependencies, wherein the schedule indicates a sequential order to individually:

lock a data among the set of data;

apply a change among the set of changes to the locked dataset of data; and release the locked data with the applied changes to update the database.

14. The computer program product of claim 13, wherein the set of dependencies indicate at least one of:

dependencies among data of the set of data;

dependencies associated with running sessions of at least one application using the set of data; and dependencies associated with workloads of the set of data.

15. The computer program product of claim 13, wherein the program instructions are further executable by the processor of the device to cause the device to identify the set of dependencies based on at least historical data of the dependencies associated with running sessions and the dependencies associated with the workloads.

16. The computer program product of claim 13, wherein the program instructions are further executable by the processor of the device to cause the device to:

generate a snapshot of the set of data; and apply the set of changes to the snapshot.

17. The computer program product of claim 13, wherein the dependencies indicate a dependency order of the data among the set of data, and the sequential order is a reverse dependency order to lock the data among the set of data.

18. The computer program product of claim 13, wherein at least a portion of the database remain accessible in response to the lock of the set of data.

* * * * *